(12) United States Patent
Dunn

(10) Patent No.: US 7,013,496 B2
(45) Date of Patent: Mar. 21, 2006

(54) PATTERNED THERMAL LINER FOR PROTECTIVE GARMENTS

(75) Inventor: Charles Dunn, Smyrna, GA (US)

(73) Assignee: Southern Mills, Inc., Union City, GA (US)

( * ) Notice: Subject to any disclaimer, the term of this patent is extended or adjusted under 35 U.S.C. 154(b) by 117 days.

(21) Appl. No.: 10/656,984

(22) Filed: Sep. 5, 2003

(65) Prior Publication Data

US 2005/0050619 A1    Mar. 10, 2005

(51) Int. Cl.
  *A62B 17/00*    (2006.01)

(52) U.S. Cl. .............................. 2/458; 2/81; 2/97; 2/272
(58) Field of Classification Search ...................... 2/81, 2/86, 97, 2.16, 272, 458, 93; 428/85, 191, 428/193, 317.9, 318.4; 442/373
See application file for complete search history.

(56) References Cited

U.S. PATENT DOCUMENTS

| 4,897,886 | A | * | 2/1990 | Grilliot et al. | ................... | 2/81 |
| 5,098,770 | A | * | 3/1992 | Paire | ........................... | 428/198 |
| 5,150,476 | A | * | 9/1992 | Statham et al. | .................. | 2/93 |
| 5,236,769 | A | * | 8/1993 | Paire | ........................... | 428/196 |
| 5,860,163 | A | * | 1/1999 | Aldridge | .......................... | 2/81 |
| 5,920,905 | A | * | 7/1999 | Aldridge | .......................... | 2/81 |
| 6,341,384 | B1 | * | 1/2002 | Hayes | ........................... | 2/458 |
| 2002/0069453 | A1 | * | 6/2002 | Kelleher et al. | ............... | 2/458 |

* cited by examiner

*Primary Examiner*—Gary L. Welch
(74) *Attorney, Agent, or Firm*—Kilpatrick Stockton LLP

(57) ABSTRACT

Disclosed are thermal liners for protective garments and protective garments that comprise thermal liners. In one embodiment, a thermal liner comprises an insulation layer comprising a batt of entangled flame resistant fibers, the insulation layer having a three-dimensional pattern that defines a plurality of closed-cell air pockets that are configured to trap air to insulate a wearer of the thermal liner, the insulation layer being shaped and configured for inclusion in the protective garment and for donning by the wearer.

43 Claims, 4 Drawing Sheets

PATTERNED THERMAL LINER FOR PROTECTIVE GARMENTS

TECHNICAL FIELD

The present disclosure is generally related to protective garments. More particularly, the present disclosure is related to patterned thermal liners that may be used in protective garments.

BACKGROUND

Firefighter garments, generally known as turnout gear, are designed to prevent the firefighter from sustaining injury from the flames and heat to which the firefighter may be exposed on the job. Generally, turnout gear includes a coat and overalls. Such garments typically comprise three layers of material that include, from the exterior to the interior, an outer shell, a moisture barrier, and a thermal liner. The outer shell layer is typically a woven fabric made from flame resistant fibers and is provided not only to resist flame, but also to protect the wearer against abrasion.

The moisture barrier, which is also flame resistant, is provided to prevent water from the firefighting environment from penetrating and saturating the garment and, more particularly, the thermal liner. Excess moisture absorbed by the thermal liner from the environment can encumber the firefighter to the point of increasing the firefighter's likelihood of experiencing heat stress.

The thermal liner is also flame resistant and offers the bulk of the thermal protection afforded by the protective garment. Normally, thermal liners include a nonwoven insulation layer composed of flame resistant fibers that is quilted to a lightweight woven facecloth, which typically is also constructed of flame resistant fibers.

As is known in the art, it is common for firefighters to perspire profusely while fighting fires due both to the heat of the environment and the effort exerted by the firefighter in serving his or her duty. This perspiration is usually absorbed into the thermal liner to keep the firefighter feeling dry. If a large amount of perspiration is absorbed by the thermal liner, the weight of what is already a relatively heavy garment may be significantly increased. As noted above, this weight can contribute to heat stress or general fatigue. Accordingly, it is desirable to provide the required amount of protection with the lightest possible garment.

SUMMARY

Disclosed are thermal liners for protective garments and protective garments that comprise thermal liners. In one embodiment, a thermal liner comprises an insulation layer comprising a batt of entangled flame resistant fibers, the insulation layer having a three-dimensional pattern that defines a plurality of closed-cell air pockets that are configured to trap air to insulate a wearer of the thermal liner, the insulation layer being shaped and configured for inclusion in the protective garment and for donning by the wearer.

BRIEF DESCRIPTION OF THE DRAWINGS

The disclosed garments and methods for making them can be better understood with reference to the following drawings. The components in the drawings are not necessarily to scale.

DETAILED DESCRIPTION

As noted above, it is desirable to provide the protection required for a firefighter with the lightest possible garment to reduce the burden on the firefighter. It follows that it is likewise desirable to provide the required thermal protection with the lightest possible thermal liner. Accordingly, advantageous results can be obtained by using materials for construction of the thermal liner that provide the greatest possible thermal protection per unit weight. In such a case, the thermal liner, and therefore the firefighter garment as a whole, can be made lighter without reducing the thermal protection it provides, or can be made more thermally protective without significantly increasing its weight. As is described in greater detail in the following discussions, these goals can be achieved by providing a patterned thermal liner that comprises a plurality of closed-cell air pockets. When provided, these air pockets trap air within the thermal liner so as to provide an increased insulative effect. Due to the absence of material in these air pockets, improved thermal protection can be provided with less material and, therefore, less weight.

Figure 1:
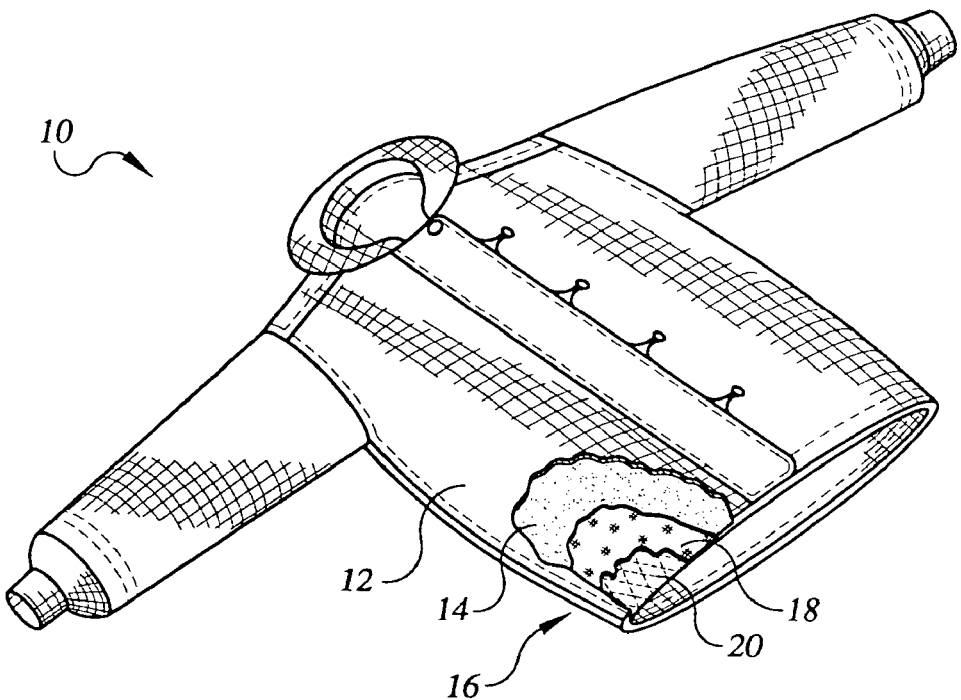
FIG. 1 illustrates a partial cut-away view of a protective garment.

FIG. 1 illustrates an example protective garment 10 that incorporates a patterned thermal liner. More particularly, FIG. 1 illustrates a firefighter turnout coat. Although a turnout coat is illustrated in FIG. 1 and explicitly discussed herein, a coat has been identified for purposes of example only. Accordingly, the present disclosure is not limited to firefighter turnout coats but instead pertains to substantially any firefighter garment or other protective garment that is to provide thermal protection.

Figure 2:
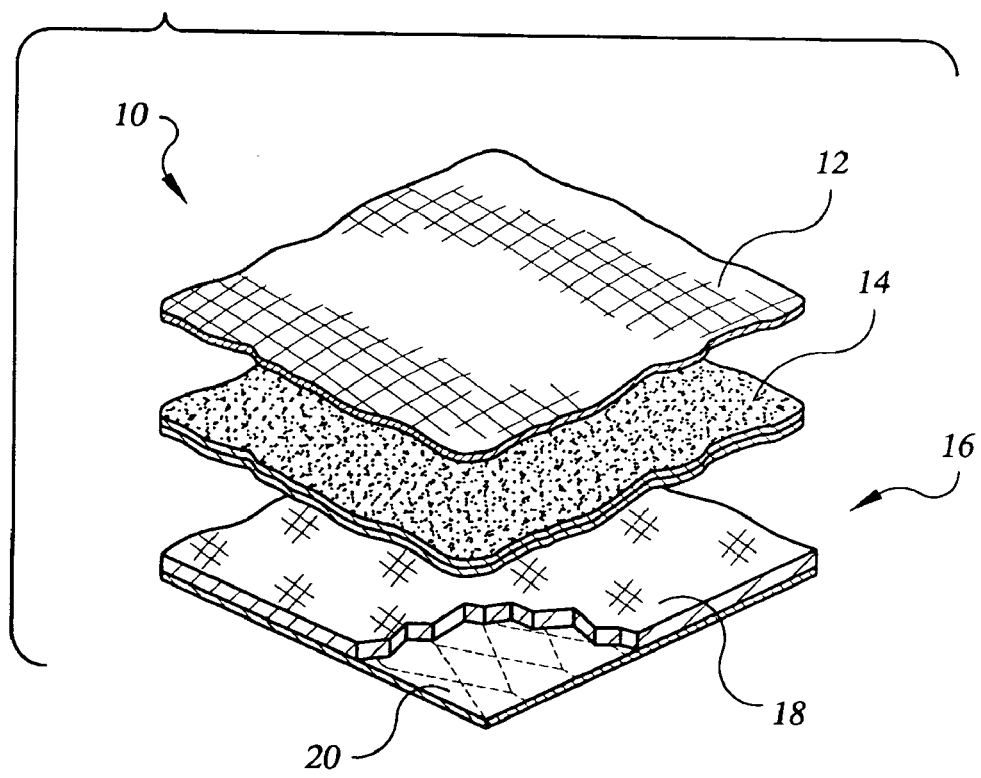
FIG. 2 illustrates an exploded perspective view of a portion of the garment illustrated in FIG. 1.

As indicated in both FIGS. 1 and 2, the protective garment 10 has a multi-layer construction that includes an outer shell 12, a moisture barrier 14, and a thermal liner 16. The outer shell 12 is typically constructed of a flame and abrasion resistant material that comprises flame resistant fibers made of, for example, aramid (meta-aramid or para-aramid), polybenzimidazole, polybenzoxazole, melamine, or the like. The outer shell 12 can be treated with a water-resistant finish such as a perfluorohydrocarbon to prevent or reduce water absorption from the outside environment in which the garment 10 is used. The weight of the outer shell material normally is within the range of about 6 ounces per square yard (osy) to about 8 osy.

The moisture barrier 14 is constructed of a non-woven or woven flame resistant fabric comprising flame resistant fibers made of, for example, aramid, melamine, or the like. The moisture barrier 14 is typically laminated with a water-impermeable layer of material such as, for instance, a layer of polytetrafluoroethylene or polyurethane. When such an impermeable layer is provided, it usually is provided on the moisture barrier 14 so as to face the thermal liner 16. The weight of the moisture barrier material is typically within the range about 4 osy to about 6 osy.

The thermal liner 16 can, optionally, include both an insulation layer 18 and a facecloth layer 20, which are quilted together. In alternative embodiments, however, the insulation layer 18 alone may be used. As is described in greater detail below, the insulation layer 18 is patterned such that it comprises a plurality of closed-cell air pockets (not visible in FIGS. 1 and 2). When it is used, the facecloth layer 20 can be constructed of woven material comprising flame resistant fibers made of, for example, aramid, melamine, flame resistant (FR) rayon, modacrylic, carbon, or the like. The facecloth layer 20 can optionally be finished with a hydrophilic finish that draws perspiration off of the firefighter's body, if desired. The weight of the facecloth layer material is normally in the range of about 1 osy to about 6 osy.

The insulation layer 18 comprises a nonwoven material (i.e., batt) that comprises a plurality of flame resistant fibers. By way of example, these fibers are made of aramid, melamine, FR rayon, modacrylic, carbon, or the like. The insulation layer material typically has a weight in the range of about 0.75 osy to about 8 osy. In a presently preferred configuration, the insulation layer material has a weight in the range of about 1.5 osy to about 2.7 osy. Notably, the weight of the insulation layer material used may depend upon how many individual fabric layers the insulation layer 18 comprises. For instance, a single layer of material having a weight of about 2 osy may be substituted with two layers of material having individual weights of about 1 osy or less, if desired. Irrespective of its weight, the material used to form the insulation layer 18 comprises a three-dimensional pattern (not visible in FIGS. 1 and 2) that forms the aforementioned closed-cell air pockets.

Figure 3:
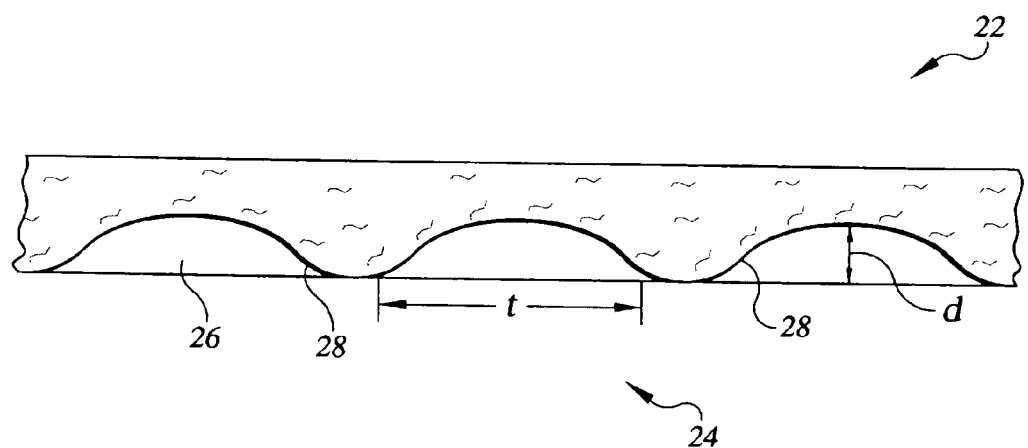
FIG. 3 illustrates a cross-sectional view of an insulation layer material used to construct a thermal liner of the garment shown in FIGS. 1 and 2.

FIG. 3 illustrates an example insulation layer material 22 in cross-section. As indicated in this figure, a pattern 24 is imposed upon the insulation layer material 22 that creates a plurality of closed-cell air pockets 26 on one side of the material that are used to trap air between the insulation layer 18 and the facecloth layer 20, or the wearer's body if no facecloth layer is provided. These air pockets 26 are designated as "closed-cell" air pockets in that each pocket is separated from adjacent pockets by boundary walls 28 that define the pocket such that air from one air pocket cannot easily mix with air from one or more adjacent air pockets. This feature impedes heat transfer and therefore increases the insulative effect of the insulation layer 18. As shown in FIG. 3, each air pocket 26 has a transverse dimension, t, and a depth dimension, d. By way of example, the transverse dimension t is within the range of about 1/16 inches to about 1/2 inches and the depth dimension d is within the range of about 1/8 inches to about 5/16 inches.

Figure 4:
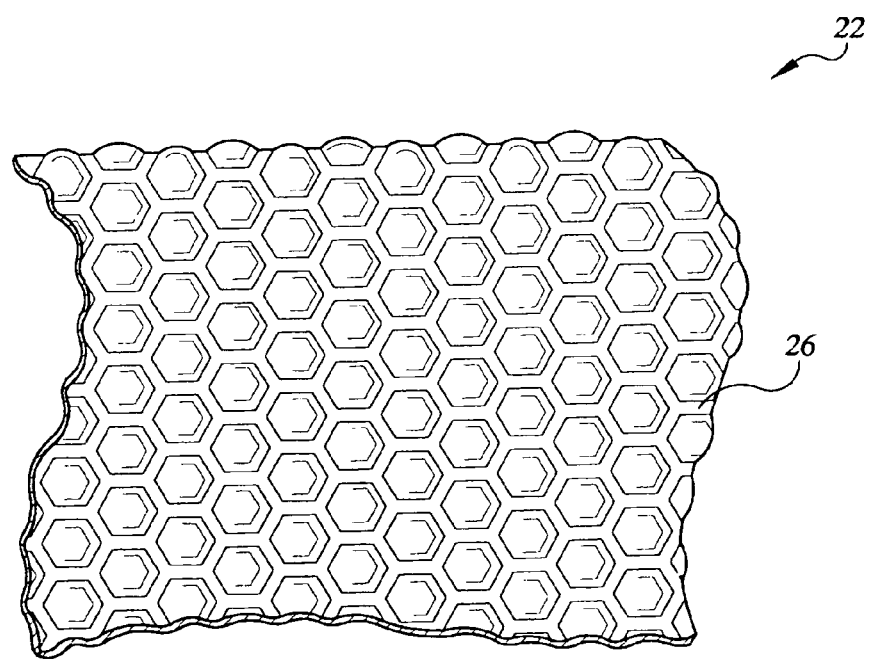
FIGS. 4–6 illustrate various embodiments of patterns that may be imparted to the material shown in FIG. 3.
Figure 5:
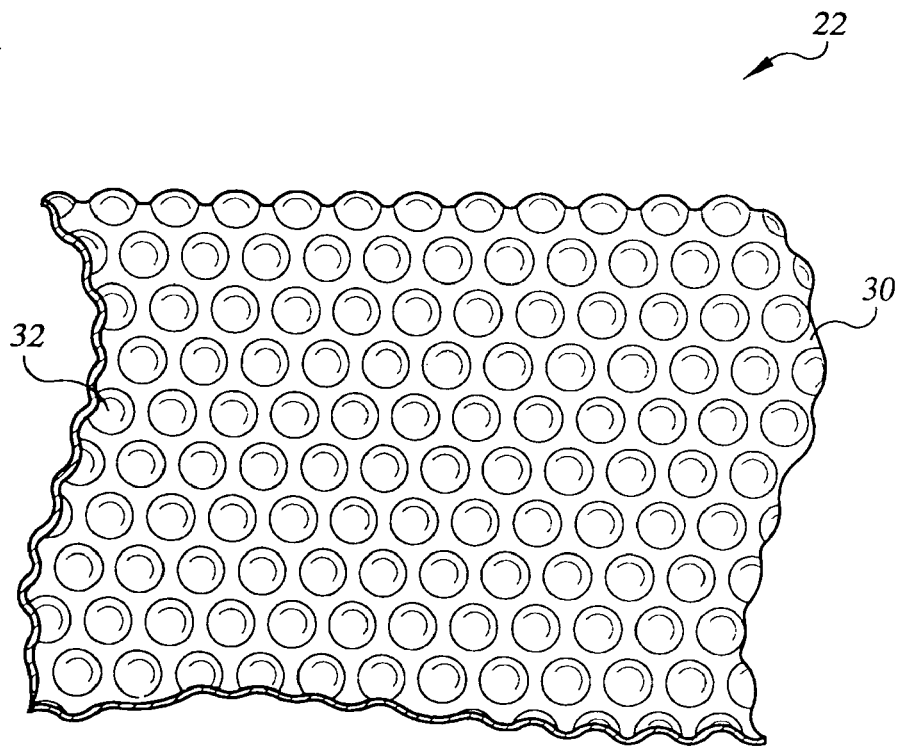
Figure 6:
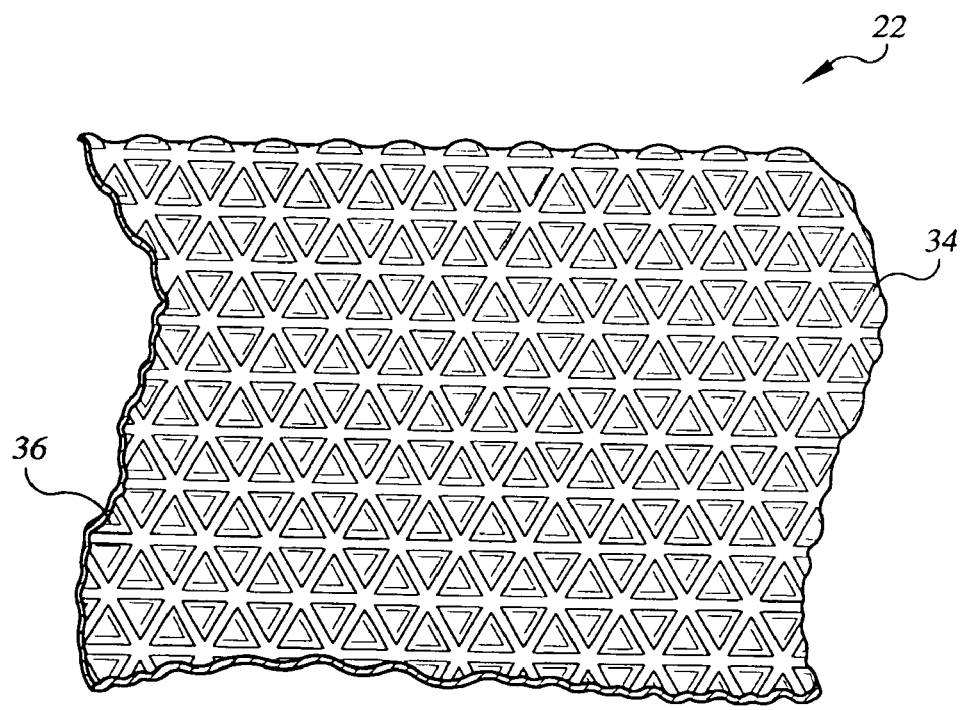

FIGS. 4–6 illustrate various different geometric patterns that can be imposed upon the insulation layer material 22 to form the closed-cell air pockets. In particular, FIG. 4 illustrates a honeycomb pattern 26 that comprises a plurality of honeycomb cells 28, wherein each cell forms an air pocket (on the reverse side of the material). As shown in this figure, the cells 28 are closely-packed such that a maximum number of closed-cell air pockets are provided. FIG. 5 illustrates a circular pattern 30 that comprises a plurality of circular cells 32. Finally, FIG. 6 illustrates a triangular pattern 34 that comprises a plurality of triangular cells 36. Although specific patterns are identified with reference to FIGS. 4–6, substantially any pattern that comprises a plurality of relatively small, closely-packed cells may be used. Irrespective of the shapes of the cells formed by the pattern imposed upon the insulation layer material 22, their dimensions preferably are relatively small in size. By way of example, each cell can have transverse (length and width) dimensions approximately equal to about 1/4 inch or smaller. In other words, each cell can cover an area of the insulation layer material 22 of approximately 1/16 square inches or smaller.

The insulation layer material 22 can be fabricated using a variety of different methods. In one suitable fabrication method, a hydroentanglement process is used which both entangles the fibers of the material 22 and forms the desired pattern on the material. An example of such a method is described in detail in published international application no. WO 02/47907, which is hereby incorporated by reference into the present disclosure in its entirety. Another example of such a method is described in published international application no. WO 02/058006, which is also hereby incorporated by reference into the present disclosure in its entirety.

Figure 7:
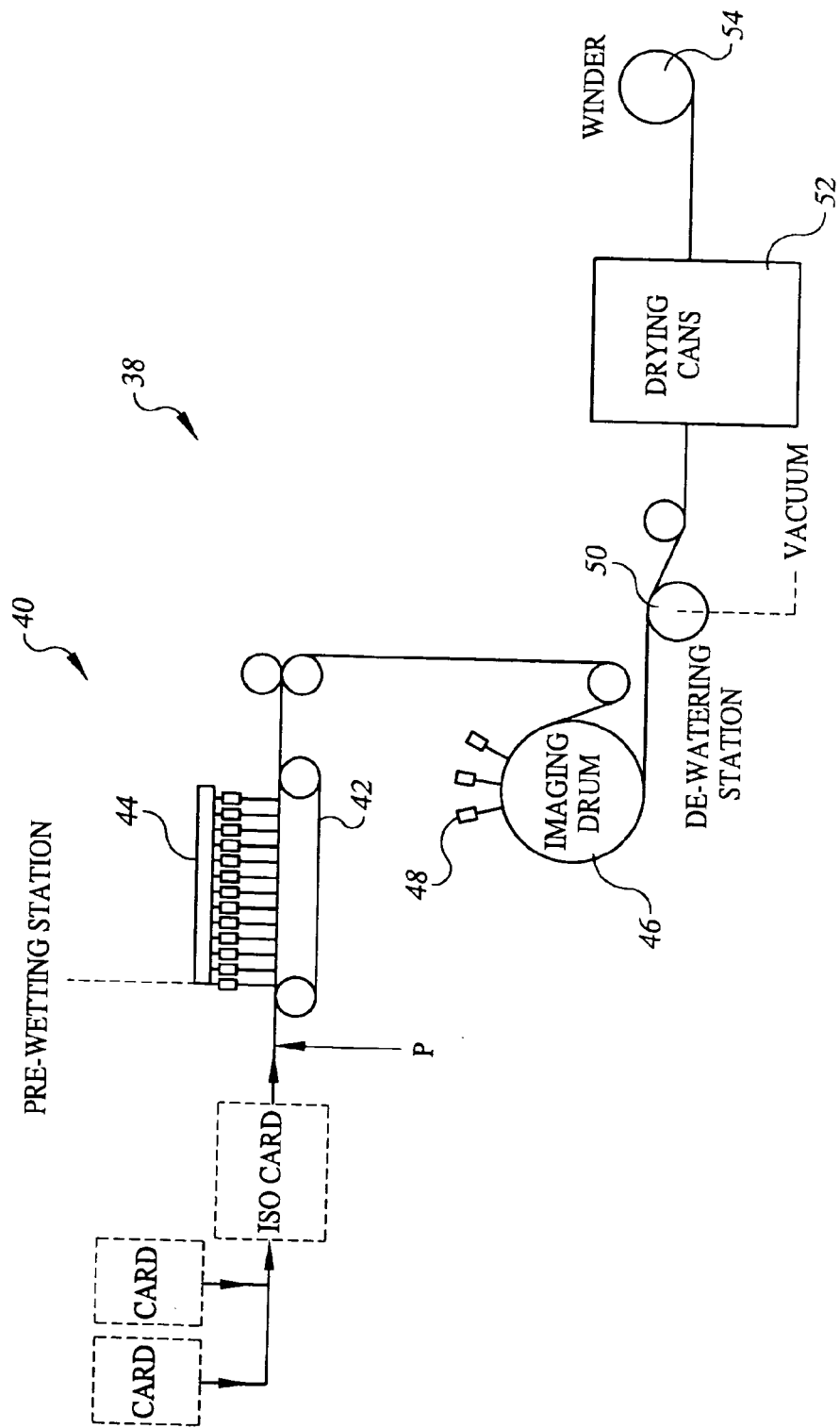
FIG. 7 illustrates apparatus that may be used to fabricate the material shown in FIG. 3.

FIG. 7 illustrates an apparatus 38 used in the aforementioned published international applications for practicing the preferred hydroentanglement process used to form the patterned insulation layer material 22. In this process, a fibrous matrix preferably comprising staple length fibers is first formed. Alternatively, however, different types of fibers, or fiber blends, can be employed. The fibers of the matrix may be selected from fibers of homogeneous or mixed fiber lengths. Suitable fibers include, for example, aramid fibers, melamine fibers, FR rayon fibers, modacrylic fibers, and carbon fibers. Staple lengths are preferably selected in the range of about 0.25 inch to about 4 inches, with the range of about 1 to 2 inches being preferred. The fiber denier is selected in the range of about 0.08 denier to about 15 denier, with the range of about 1 to 6 denier being preferred.

The fibrous matrix is preferably carded and air-laid or cross-lapped to form a precursor web, designated P. Alternatively, however, a scrim can be interposed in the formation of the precursor web. The purpose of the scrim, when provided, is to reduce the extensibility of the resultant three-dimensional patterned ("imaged") nonwoven material, thus reducing the possibility of three-dimensional pattern ("image") distortion and further enhancing fabric durability. Suitable scrims include unidirectional monofilament, bi-directional monofilament, expanded films, and thermoplastic spunbond.

A binder material can also be incorporated either as a fusible fiber in the formation of the precursor web P or as a liquid fiber adhesive applied after imaged fabric formation. When used, the binder material improves the durability of the resultant imaged nonwoven fabric during application of harsh or abrasive surface treatments.

With further reference to FIG. 7, the precursor web P is fed through a pre-wetting station 40 using a suitable conveyance mechanism such as a belt 42. At this station 40, high pressure water is applied to the web P using an entangling manifold 44 such that the fibers of the web are entangled with each other. By way of example, jets of water can be applied with 120 micron orifices spaced at 42.3 per inch with the manifolds successively operated at three strips each at 100, 300, 800, and 800 pounds per square inch (psi) at a line speed of 60 feet per minute. In another example, three orifice strips each including 120 micron orifices spaced at 42.3 per inch and operated at 100, 300, and 600 psi with a line speed of 45 feet per minute may be used. In an alternative method, the web P may be needlepunched using a needlepunching machine instead of being hydroentangled using the station 40.

Once passing through the pre-wetting station 40, the entangled web is applied to a drum 46, which comprises a plurality of three-dimensional image elements that are used to impart the selected pattern to the web and, therefore, the resultant material. These image elements comprise openings or depressions that are used to form the various cells of the insulation layer material 22. When openings are provided, the openings act as drainage openings in the surface of the drum 46 for the high pressure water streams that are ejected from entangling manifolds 48 positioned around the periphery of the drum. These openings can, for example, have diameters in the range of about 0.1 to 0.2 inches. The streams or jets cause the fibers of the web to further entangle and form the cells by conforming to the shape of the drum 46. If openings are used, the web density, jet pressure, and opening sizes are selected such that fibers are urged into the openings but do not separate to form openings in the web. Instead, three-dimensional cells are formed at each opening (or depression) so as to form the desired pattern.

By way of example, three entangling manifolds 48 are operated at 2800 psi at a line speed of 60 feet per minute or 45 feet per minute. Once patterned on the drum 46, the now-formed insulation layer material 22 is dewatered at a vacuum dewatering station 50, dried over drying cans 52, and then wound by a winder 54.

The advantageous results that are obtainable when a pattern is imposed upon an insulation layer material 22, and therefore the thermal liner 16, can be appreciated from Table I. This table compares the thermal protective performance (TPP) of two different garment types, each including a layer of outer shell material, a layer of water barrier material, and a layer of thermal liner material. Garment Type #1 comprised a woven 7.5 osy outer shell made of 60% para-aramid and 40% PBI; a Crosstech 2C® moisture barrier supplied by W. L. Gore; two layers of a patterned spunlace insulation layer with each layer weighing 2.5 osy and made up of 50% Basofil fibers supplied by Basofil Fibers LLC, 25% meta-aramid, and 25% para-aramid; and a woven face cloth of 100% meta-aramid weighing 3.7 osy.

Garment Type #2 comprised a woven 7.5 osy outer shell made of 60% para-aramid and 40% PBO; a Crosstech 2C® moisture barrier; two layers of a patterned spunlace insulation layer with each layer weighing 2.5 osy and made of 50% Basofil, 25% meta-aramid, and 25% para-aramid; and a woven face cloth of 100% meta-aramid weighing 3.7 osy.

TABLE I

| Insulation Layer | TPP | % Inc. | Avg. Composite Wt (oz/yd) | TPP/oz | % Change TPP/oz |
|---|---|---|---|---|---|
| GARMENT TYPE #1 | | | | | |
| Before Wash | | | | | |
| 2 layer Control | 38.6 | n/a | 9.2 | 4.20 | n/a |
| 2 layer Small Honeycomb | 43.1 | 11.7% | 8.7 | 4.94 | 17.6% |
| 2 layer Large Honeycomb | 42.9 | 11.1% | 8.6 | 4.97 | 18.4% |
| After 5× Wash | | | | | |
| 2 layer Control | 48.6 | n/a | 8.7 | 5.61 | n/a |
| 2 layer Small Honeycomb | 49.2 | 1.2% | 8.6 | 5.72 | 2.0% |
| 2 layer Large Honeycomb | 50.9 | 4.7% | 8.8 | 5.82 | 3.7% only 2 samples in TPP |
| GARMENT TYPE #2 | | | | | |
| Before Wash | | | | | |
| 2 layer Control | 36.8 | n/a | 9.2 | 4.00 | n/a |
| 2 layer Small Honeycomb | 41.1 | 11.7% | 9.0 | 4.55 | 13.7% |
| 2 layer Large Honeycomb | 39.7 | 7.9% | 9.0 | 4.39 | 9.9% |
| After 5× Wash | | | | | |
| 2 layer Control | 45.7 | n/a | 9.0 | 5.06 | n/a |
| 2 layer Small Honeycomb | 47.3 | 3.5% | 8.8 | 5.35 | 5.8% |
| 2 layer Large Honeycomb | 45.9 | 0% | 8.4 | 5.44 | 7.6% |

Testing was conducted both before and after laundering as to each garment type. More particularly, testing was conducted on three different versions of each garment type: (1) a version incorporating two layers of plain insulation layer material (i.e., the control), (2) a version incorporating two layers of patterned insulation layer material having small honeycomb cells, and (3) a version incorporating two layers of patterned insulation layer material having large honeycomb cells. The small honeycomb cells had transverse dimensions (from one edge to the opposite, parallel edge) of approximately ⅛ inches, while the large honeycomb cells had transverse dimensions (from one edge to the opposite, parallel edge) of approximately ¼ inches.

In that the weights of the patterned insulation layer material were less than the plain insulation material of the "control" garments, the control version of each garment type was heavier (in terms of composite weight) than the versions that incorporated patterned insulation material. Despite this fact, however, the TPP values were generally higher for the garment versions that incorporated the patterned insulation material. For instance, the TPP values for the versions of Garment Type #1 using patterned insulation material exhibited TPP values approximately 11% to 12% greater than the version of Garment Type #1 using the plain insulation material. When the differences in weight are taken into account, however, the percentage increase is much larger. For instance, the percentage increase in TPP values per ounce for the versions of Garment Type #1 using patterned insulation material were approximately 18% greater than the version of Garment Type #1 using the plain insulation material.

From the above, it can be appreciated that greater thermal protection per unit weight can be provided when thermal liners incorporating patterned insulation layer material are used. Accordingly, the same thermal protection provided by conventional garments can be provided by a significantly lighter garment, or increased thermal protection can be provided by a garment having the same weight as a conventional garment.

What is claimed is:

1. A thermal liner for use in a protective garment, the liner comprising:
    an insulation layer comprising a batt of entangled flame resistant fibers, the batt having a three-dimensional pattern that defines a plurality of closed-cell air pockets that are configured to trap air to insulate a wearer of the thermal liner, the insulation layer being shaped and configured for inclusion in the protective garment and for donning by the wearer.

2. The thermal liner of claim 1, wherein the batt comprises at least one of aramid, melamine, FR rayon, modacrylic, and carbon fibers.

3. The thermal liner of claim 1, wherein the closed-cell air pockets are formed on an inner side of the insulation layer adapted to face the wearer.

4. The thermal liner of claim 1, wherein the closed-cell air pockets are defined by boundary walls.

5. The thermal liner of claim 1, wherein the closed-cell air pockets comprise repeated geometric shapes.

6. The thermal liner of claim 5, wherein the repeated geometric shapes comprise at least one of honeycombs, circles, and triangles.

7. The thermal liner of claim 1, wherein the closed-cell air pockets have transverse dimensions within the range of about 1/16 inches to about 1/2 inches and depth dimensions within the range of about 1/8 inches to about 5/16 inches.

8. The thermal liner of claim 1, wherein the insulation layer has a weight in the range of about 0.75 ounces per square yard to about 8 ounces per square yard.

9. The thermal liner of claim 1, wherein the insulation layer has a weight in the range of about 1.5 ounces per square yard to about 2.7 ounces per square yard.

10. The thermal liner of claim 1, comprising multiple insulation layers, each insulation layer comprising a batt of entangled flame resistant fibers and having a three-dimensional pattern that defines a plurality of closed-cell air pockets that are configured to trap air to insulate the wearer of the thermal liner.

11. The thermal liner of claim 1, further comprising a facecloth layer that is attached to the insulation layer, the facecloth layer comprising a plurality of flame resistant fibers.

12. The thermal liner of claim 11, wherein the facecloth layer is attached to an inner side of the insulation layer such that the closed-cell air pockets of the insulation layer face the facecloth layer.

13. The thermal liner of claim 11, wherein the facecloth layer comprises at least one of aramid, melamine, FR rayon, modacrylic, and carbon fibers.

14. The thermal liner of claim 11, wherein the facecloth layer comprises a hydrophilic finish.

15. A thermal liner for use in a protective garment, the liner comprising:
an insulation layer comprising a batt of entangled flame resistant fibers, the batt having a three-dimensional geometric pattern provided on an inner side of the insulation layer that forms a plurality of closed-cell air pockets that are defined by boundary walls and that are configured to trap air to insulate a wearer of the thermal liner; and
a facecloth layer that is attached to the inner side of the insulation layer, the facecloth layer comprising a plurality of flame resistant fibers;
wherein the thermal liner is shaped and configured for inclusion in the protective garment and for donning by the wearer.

16. The thermal liner of claim 15, wherein the batt comprises at least one of aramid, melamine, FR rayon, modacrylic, and carbon fibers.

17. The thermal liner of claim 15, wherein the closed-cell air pockets have geometric shapes that comprise at least one of honeycombs, circles, and triangles.

18. The thermal liner of claim 15, wherein the closed-cell air pockets have transverse dimensions within the range of about 1/16 inches to about 1/2 inches and depth dimensions within the range of about 1/8 inches to about 5/16 inches.

19. The thermal liner of claim 15, wherein the insulation layer has a weight in the range of about 0.75 ounces per square yard to about 8 ounces per square yard.

20. The thermal liner of claim 15, wherein the insulation layer has a weight in the range of about 1.5 ounces per square yard to about 2.7 ounces per square yard.

21. The thermal liner of claim 15, comprising multiple insulation layers, each insulation layer comprising a batt of entangled flame resistant fibers and a three-dimensional pattern that defines a plurality of closed-cell air pockets that are configured to trap air to insulate the wearer of the thermal liner.

22. The thermal liner of claim 15, wherein the facecloth layer comprises at least one of aramid, melamine, FR rayon, modacrylic, and carbon fibers.

23. The thermal liner of claim 15, wherein the facecloth layer comprises a hydrophilic finish.

24. A protective garment, comprising:
an outer shell formed of a flame and abrasion resistant material;
a moisture barrier formed of a flame resistant material; and
a thermal liner including an insulation layer comprising a batt of entangled flame resistant fibers, the batt having a three-dimensional pattern provided on an inner side of the insulation layer that forms a plurality of closed-cell air pockets that are configured to trap air to insulate a wearer of the protective garment.

25. The protective garment of claim 24, wherein the insulation layer batt comprises at least one of aramid, melamine, FR rayon, modacrylic, and carbon fibers.

26. The protective garment of claim 24, wherein the closed-cell air pockets of the insulation layer comprise repeated geometric shapes.

27. The protective garment of claim 26, wherein the repeated geometric shapes comprise at least one of honeycombs, circles, and triangles.

28. The protective garment of claim 24, wherein the closed-cell air pockets of the insulation layer have transverse dimensions within the range of about 1/16 inches to about 1/2 inches and depth dimensions within the range of about 1/8 inches to about 5/16 inches.

29. The protective garment of claim 24, wherein the insulation layer has a weight in the range of about 0.75 ounces per square yard to about 8 ounces per square yard.

30. The protective garment of claim 24, wherein the insulation layer has a weight in the range of about 1.5 ounces per square yard to about 2.7 ounces per square yard.

31. The protective garment of claim 24, wherein the insulation layer comprises a facecloth layer that is attached to the inner side of the insulation layer, the facecloth layer comprising a plurality of flame resistant fibers.

32. The protective garment of claim 31, wherein the facecloth layer comprises at least one of aramid, melamine, FR rayon, modacrylic, and carbon fibers.

33. A thermal liner comprising:
an insulation layer comprising a batt of entangled flame resistant fibers, the batt having a three-dimensional pattern that is physically imprinted into the batt, the three-dimensional pattern defining a plurality of closed-cell air pockets that are configured to trap air to insulate a wearer of the thermal liner.

34. The thermal liner of claim 33, wherein the three-dimensional pattern is physically imprinted into the batt through a hydroentanglement process.

35. The thermal liner of claim 33, wherein the batt comprises one or more of aramid, melamine, FR rayon, modacrylic, and carbon fibers.

36. The thermal liner of claim 33, wherein the closed-cell air pockets are defined by boundary walls that separate each air pocket from adjacent air pockets.

37. The thermal liner of claim 33, wherein the closed-cell air pockets comprise repeated geometric shapes.

38. The thermal liner of claim 37, wherein the repeated geometric shapes comprise one or more of honeycombs, circles, and triangles.

39. The thermal liner of claim 33, wherein the closed-cell air pockets have transverse dimensions within the range of about 1/16 inches to about 1/2 inches and depth dimensions within the range of about 1/8 inches to about 5/16 inches.

40. The thermal liner of claim 33, wherein the insulation layer has a weight in the range of about 1.5 ounces per square yard to about 2.7 ounces per square yard.

41. The thermal liner of claim 33, further comprising a facecloth layer that is attached to the insulation layer, the facecloth layer comprising a plurality of flame resistant fibers.

42. The thermal liner of claim 33, wherein the facecloth layer is attached to an inner side of the insulation layer such that the closed-cell air pockets of the insulation layer face the facecloth layer.

43. The thermal liner of claim 42, wherein the facecloth layer comprises a hydrophilic finish.

* * * * *